US 9,302,544 B2

(12) United States Patent
Jie (10) Patent No.: US 9,302,544 B2
(45) Date of Patent: Apr. 5, 2016

(54) TWIN-PEDAL-CONTROLLED SWIVEL CASTER

(71) Applicant: FUJIAN SECURE MEDICAL TECHNOLOGY CO. LTD, Fuzhou, Fujian (CN)

(72) Inventor: Yebing Jie, Fujian (CN)

(73) Assignee: FUJIAN SECURE MEDICAL TECHNOLOGY CO. LTD, Fujian (CN)

( * ) Notice: Subject to any disclaimer, the term of this patent is extended or adjusted under 35 U.S.C. 154(b) by 0 days.

(21) Appl. No.: 14/420,663

(22) PCT Filed: Jan. 25, 2013

(86) PCT No.: PCT/CN2013/071001
§ 371 (c)(1),
(2) Date: Feb. 9, 2015

(87) PCT Pub. No.: WO2014/113978
PCT Pub. Date: Jul. 31, 2014

(65) Prior Publication Data
US 2015/0239291 A1    Aug. 27, 2015

(51) Int. Cl.
*B60B 33/00* (2006.01)
*B60B 33/02* (2006.01)

(52) U.S. Cl.
CPC ........... *B60B 33/021* (2013.01); *B60B 33/0042* (2013.01); *B60B 33/0078* (2013.01); *B60B 33/0086* (2013.01); *B60B 33/025* (2013.01); *B60B 33/0049* (2013.01); *Y10T 16/195* (2015.01)

(58) Field of Classification Search
CPC ... Y10T 16/195; Y10T 16/196; Y10T 16/216; B60B 33/0078; B60B 33/0086; B60B 33/02; B60B 33/021; B60B 33/023; B60B 33/025; B60B 33/0042; A61G 2007/0528; A61G 2301/046; A61G 2301/0463; A61G 2301/0465; A61G 2301/0467
See application file for complete search history.

(56) References Cited

U.S. PATENT DOCUMENTS 4,835,815 A    6/1989   Mellwig et al.
4,941,552 A    7/1990   Screen
(Continued)

FOREIGN PATENT DOCUMENTS

CN    201092234    7/2008
CN    101376320    3/2009
(Continued)

OTHER PUBLICATIONS

International Search Report of PCT/CN2013/071001 dated Oct. 31, 2013.

*Primary Examiner* — Chuck Mah
(74) *Attorney, Agent, or Firm* — Rankin, Hill & Clark LLP (57) ABSTRACT

Disclosed is a twin-pedal-controlled swivel caster, comprising a caster body frame (1), a pair of caster assemblies (2) disposed at two sides of the caster body frame (1), a swivel assembly (5) disposed on the caster body frame (1), and a braking module (3) capable of braking by stepping on a braking pedal (32) and a brake release module (4) capable of resetting the movement of the caster by stepping on a braking release pedal (41), both of which are disposed in the caster body frame (1). By means of the pedals, the swivel caster can both lock the rotation of a wheel plate of the caster and lock the direction of rotation of the caster, and can also release the dual-locked state by means of the braking release pedal (41) located in the same direction as the braking pedal (32), making the caster return to a state of full freedom again. The braking and braking release actions of the swivel caster are convenient and easy, and the swivel caster is simple to operate.

12 Claims, 7 Drawing Sheets

(56) References Cited

U.S. PATENT DOCUMENTS

| | | | |
|---|---|---|---|
| 5,988,323 A | 11/1999 | Chu | |
| 6,360,851 B1* | 3/2002 | Yang | B60B 33/0028 16/35 R |
| 6,810,560 B1* | 11/2004 | Tsai | B60B 33/0021 16/20 |
| 2006/0254867 A1 | 11/2006 | Yan | |
| 2007/0289098 A1* | 12/2007 | Tsai | B60B 33/0042 16/35 R |
| 2009/0019670 A1 | 1/2009 | Tsai | |
| 2009/0113671 A1* | 5/2009 | Chu | B60B 33/0002 16/35 R |
| 2009/0276977 A1* | 11/2009 | Liao | B60B 33/0018 16/35 R |
| 2010/0170061 A1 | 7/2010 | Lin | |
| 2010/0263164 A1* | 10/2010 | Lin | B60B 33/0042 16/47 |
| 2011/0010892 A1* | 1/2011 | Von Bordelius | B60B 33/001 16/35 R |
| 2011/0289729 A1* | 12/2011 | Tsai | B60B 33/0042 16/35 R |
| 2012/0317752 A1 | 12/2012 | Dayt | |

FOREIGN PATENT DOCUMENTS

| | | |
|---|---|---|
| FR | 2882690 | 9/2006 |
| JP | 08207504 A * | 8/1996 |
| JP | 11321208 A * | 11/1999 |

* cited by examiner

TWIN-PEDAL-CONTROLLED SWIVEL CASTER

TECHNICAL FIELD

The present application relates to a caster, in particular, it relates to a double-pedal controlled swivel caster.

BACKGROUND

After wheel was invented, it has become easier to move large size item. There was significant deficiency for early wheels, i.e., the wheels could only move along a straight line or they were difficult to brake, as a result the flexibility for movement and the safety for stop were restricted. Then the wheel with all degrees of freedom and brake structure was created, that is what we now call "universal caster". Nowadays the universal casters are widely used in the fields of medical instrument, office, retailing device, furniture and the like. The appearance of universal caster has brought an Epoch-making revolution for people to move equipment. With the continuous upgrade of the application demand, the caster has gradually become a necessary part of daily work, it can endow more and more devices for working in office and operation with mobile ability. Current universal caster is typically braked with a single pedal, in this case, for shifting between the braking and the releasing of brake, the user should continuously change the force direction of foot so as to perform the operation on the caster, for example, when brake a caster the pedal should be pressed down; when release the brake the pedal should be raised up. The user may feel uncomfortable after a long period of repeated braking operation, therefore the existing caster structure should be improved, and the traditional mode of braking a caster by pressing down and raising up the pedal should be altered by adding auxiliary parts.

SUMMARY

The technical problem to be solved by the present application is to overcome the deficiency in prior art, and provide a double-pedal controlled swivel caster, which comprises two pedals located in the same direction to perform both the operations of universally braking and releasing of brake.

To solve the above-said technical problem, the present application provides the following technical solution: a double-pedal controlled swivel caster comprising a caster main frame, a pair of caster assemblies disposed at both sides of the caster main frame, a swivel assembly disposed on the caster main frame, and a braking module arranged in the caster main frame for braking after a brake pedal is pressed down, and a brake release module arranged in the caster main frame for restoring the movement of the caster after a braking release pedal is pressed down.

Further, there are two wheel sheet slots arranged on both sides of the caster main frame for setting the caster assemblies, and a central shaft disposed in the wheel sheet slots, and the caster assembly comprises a wheel sheet sleeved on the central shaft.

Further, there is a main shaft hole arranged on the caster main frame, and the swivel assembly comprises a spindle cover, bearing and universal brake gear set, wherein the universal brake gear set includes a upper gear and a lower gear engaging with each other, the universal brake gear set is arranged inside the bearing, the universal brake gear set and the bearing are fixed inside the main shaft hole by means of the spindle cover.

In particular, the caster main frame contains a brake groove therein, the brake module is disposed inside the brake groove, the brake module comprises a brake block arranged inside the brake groove for controlling the rotation of the wheel sheet and a brake pedal arranged inside the brake block with one side extending outside the caster main frame for jacking up the brake block.

In particular, a first universal engaging tooth is arranged at the bottom of the lower gear of the swivel assembly, a top sheet is arranged on the top of the brake block, and a second universal engaging tooth engagable with the first universal engaging tooth is disposed on the top sheet.

In particular, an annular groove is disposed on one side of the wheel sheet, and a first brake engaging tooth is arranged on the wall surface of the inner ring of the annular groove, the brake block includes a main body, a positioning hole arranged at the center of the main body and movable upwards and downwards along the central shaft of the central shaft of the caster main frame, and a brake pad extending outwards from each side of the bottom of the main body, wherein the brake pad passes through the caster main frame and inserts into the annular groove of the wheel sheet, and a second brake engaging tooth engagable with the first brake engaging tooth is arranged on the surface of the brake pad.

In particular, a hollow groove is arranged inside the brake block main body, the brake pedal comprises a main body and a pedal connected therewith and extending outwards, a center hole concentrical to the central shaft of the caster main frame is arranged on the main body, a convex surface contactable with the brake block is arranged outside the main body, and the main body is arranged inside the hollow groove of the brake block main body.

In particular, a slope is arranged on the main body of the brake block, and the brake release module butts against the slope.

Furthermore, a brake release groove and a restriction rail along the axis thereof are arranged on the caster main frame, the brake release module containing a brake release pedal and a spacing shaft is arranged inside the brake release groove, wherein the brake release pedal contains a pedal and an ejector rod perpendicular thereto, a spacing hole is disposed on the ejector rod for the spacing shaft passing through, the spacing shaft is movable along the restriction rail of the caster main frame, and the ejector rod butts against the brake module.

In particular, the brake release module further comprises a return spring arranged on the ejector rod.

The advantageous effect of the present application is as follows: the swivel caster in the double-pedal controlled swivel caster according to the present application can not only rotate in different directions freely, but also lock the wheel sheet and prohibit its rotation by means of the pedal, so the caster is fixed and cannot rotate any more, more important, the double locked status can be released by means of another brake release pedal, therefore the caster resets to universal rotation with full degrees of freedom. The caster contains a brake module which not only controls the lock of wheel sheet of caster automatically to prohibit its rotation, but also capable of locking the universal control direction so as to prevent the random rotation of the whole caster, the caster also contains a brake release module which may release the double locked state by means of the brake release pedal of the same orientation with the brake module. In particular, as the brake release pedal is pressed down, the brake block of the brake module is pushed down simultaneously, so the caster obtains the freedom of moving and the brake release module eliminates the painful lift of the brake pedal for the brake release, therefore both actions of brake and release are easy to perform.

BRIEF DESCRIPTION OF THE DRAWINGS

FIG. 4-1 is a perspective view of the caster main frame of a double-pedal controlled caster according to an example of the present application.

FIG. 4-2 is a side view of the caster main frame of a double-pedal controlled caster according to an example of the present application.

In the accompanying Figures: 1: caster main frame, 11: central shaft; 12: wheel sheet slot; 13: brake groove; 131: hollow groove;

132: side groove; 14: brake release groove; 141: restriction rail; 15: main shaft hole;

2: caster assembly; 21: wheel sheet; 211: sheet shaft hole; 212: annular groove;

2121: first brake engaging tooth; 213: buckling groove; 22: caster lid; 221: clamp clasp;

23: caster bearing, 24: bearing cap;

3: brake module, 31: brake block, 311: positioning shaft hole, 312: brake pad,

3121: second brake engaging tooth, 313: positioning shaft, 314: hollow groove,

315: top sheet, 3151: second universal engaging tooth, 316: brake release slope,

32: brake pedal, 321: main body, 3211: center hole, 322: pedal, 33: retaining spring;

4: brake release module, 41: brake release pedal, 411: pedal, 412: ejector rod, 413: spacing hole,

42: return spring, 43: spacing shaft;

5: swivel assembly, 51: spindle cover, 52: universal brake gear, 521: upper gear,

522: lower gear: 5221: first universal engaging tooth, 53: bearing.

DETAILED DESCRIPTION OF THE INVENTION

Objects, advantages and embodiments of the present application will be explained below in detail with reference to the accompanying drawings and examples. However, it should be appreciated that the following description of the example is merely exemplary in nature and is not intended to limit this application.

Referring to FIGS. 1 to 8, a double-pedal controlled swivel caster according to the present application is shown. The swivel caster is suitable to install onto all kinds of equipment, so as to make the equipment to rotate, move and brake freely. In particular, the swivel caster can be employed in such equipment as medical device, health care device, mobile retailing equipment, household furniture and the like. Next, for further details please refer to FIGS. 1 to 3, the embodiments of the present application provide the structure of a double-pedal controlled swivel caster, which includes a caster main frame 1, a pair of caster assemblies 2 disposed on both sides of the caster main frame 1, a swivel assembly 5 disposed on the caster main frame 1, and a braking module 3 arranged in the caster main frame 1 for braking after stepping on a brake pedal 32, and a brake release module 4 arranged in the caster main frame 1 for restoring the movement of the caster after stepping on a braking release pedal 41. There are a set of caster assemblies 2 arranged on each side of the main frame 1, such that the basic function of moving freely for the swivel caster can be achieved. A swivel assembly 5 is disposed on the caster main frame 1, when the caster including the caster main frame 1 is installed on equipment, it can endow this caster with rotation function of full freedom degree. Meanwhile, the brake module 3 in the main frame 1 can brake the caster by means of stepping on the brake pedal 32. The brake module 3 can control the two caster assemblies 2 on both sides, so as to stop the caster assembly 2 and control the movement of the caster; meanwhile the brake module 3 can also control the swivel assembly 5, as a result the caster cannot rotate, therefore after preforming the brake the caster is totally kept in the status of "double locked", i.e., stop moving and rotating. With respect to the release of the brake to the brake module 1, there is no need to raise the brake pedal up. The release of brake can be carried out directly by employing the brake release module 4 of the same direction with the brake module 3 of the present application. By means of stepping on the brake release pedal 41 of the brake release module 4, the components of "double locked" status in the brake module 3 is reset, thereby the brake state is released, and the swivel caster restores to the capability of moving and rotating with full freedom degree. Both the brake pedal 32 of the brake module 3 and the brake pedal 32 of the brake release module 4 of the present application employ the brake mode of receiving force in the same direction, therefore the operations of brake and release can be carried out easily, and the equidirection control of double pedals can be achieved.

Figure 5:
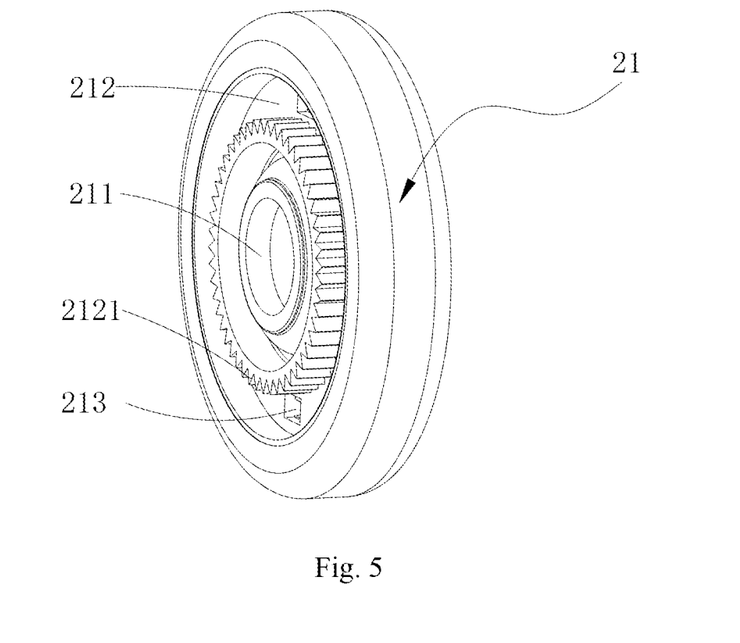
FIG. 5 is a perspective view of the wheel sheet of a double-pedal controlled caster according to an example of the present application.
Figure 41:
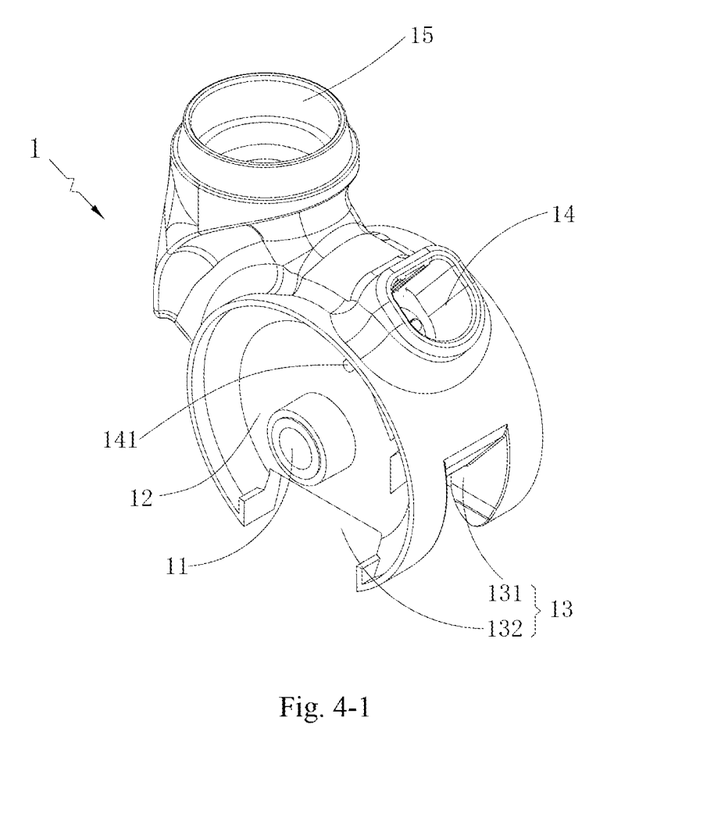
Figure 42:
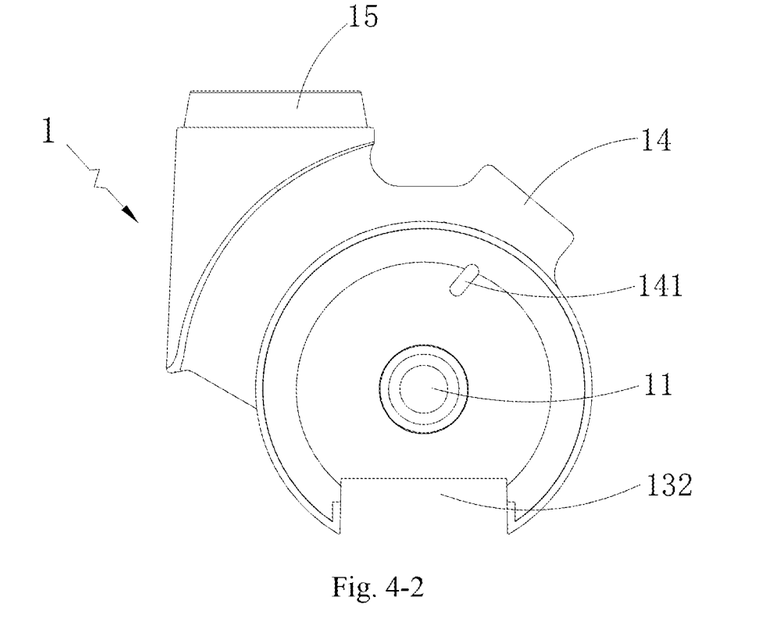

In particular, please refer to FIGS. 4-1 to 5, there are two wheel sheet slots 12 for receiving corresponding caster assemblies 2 arranged on both sides of the caster main frame 1, and a central shaft 11 is arranged inside the wheel sheet slot 12. The caster assembly 2 contains a wheel sheet 21 disposed on the central shaft 11 and a caster lid 22 arranged outside of the wheel sheet 21. In particular, there is a shaft hole 211 arranged at the center of the wheel sheet 21. A bearing 23 is installed in the shaft hole 211 of wheel sheet 21, and the wheel sheet 21 containing bearing 23 is fixed onto the central shaft 11 of the caster main frame 1. A bearing cap 24 is disposed between the wheel sheet 21 and the caster lid 22, the bearing cap 24 is used for pressing against the inner ring of the bearing 23, so as to fix the wheel sheet 21 onto the central shaft 11 of the caster main frame 1 meanwhile the wheel sheet 21 remains rotatable around the central shaft 11. And the bearing cap 24 can be pressed onto the wheel sheet 21 tightly by means of caster lid 24. The caster lid 22 is buckled outside the wheel sheet 21. There are four evenly spaced clamp clasps 221 perpendicular to caster lid 22 arranged on one side along the circumference of the caster lid 22, and there are four buckling groove 213 corresponding to and engagable with the clamp clasps 221 arranged along the circumference of the wheel sheet 22. The clamp clasp 221 of the caster lid 22 is buckled into the buckling groove 213 of wheel sheet 21, so as to press the bearing cap 24 against the inner ring of the bearing 23.

Next, please refer to FIG. 4-1, there is a main shaft hole 15 arranged on the caster main frame 1, and the swivel assembly 5 comprises a spindle cover 51, a bearing 53 and a universal brake gear set 52, wherein the universal brake gear set 52 includes an upper gear 521 and a lower gear engaging with the upper gear 521, the universal brake gear set 52 is arranged inside the bearing 53, the universal brake gear set 52 and the bearing 53 are fixed inside the main shaft hole 15 by means of the spindle cover 51. Specifically, the device employing the swivel caster can be fixed onto the swivel assembly 5 by means of an axis body. And the swivel caster controls the free movement of the whole caster by means of the swivel assembly 5 as it contains a universal brake gear set 52. The upper gear 521 has a through hole for an axis body passing through, the upper gear 521 contains an upper cylinder and an upper retainer ring connected thereto, the through hole runs through both the upper cylinder and the upper retainer ring, and there is a first meshing tooth engagable with the lower gear 522 disposed on the bottom side of the upper cylinder. The upper cylinder of the upper gear 521 is arranged inside the bearing 53, and the upper retainer ring presses against the inner ring of the bearing 53. The lower gear 522 also contains a through hole for an axis body passing through, the lower gear 522 contains a lower cylinder and a lower retainer ring connected thereto, the through hole runs through both the lower cylinder and the lower retainer ring, and there is a second meshing tooth engagable with the first meshing tooth of the upper gear 521 disposed on the upper side of the lower cylinder. The lower cylinder of the lower gear 522 is arranged inside the bearing 53, and the lower retainer ring presses against the outer ring of the bearing 53. The lower retainer ring of the lower gear 522 is arranged on the bottom of the main shaft hole 15 of the caster main frame 1, the upper gear 521 is locked into the main shaft hole 15 by means of the spindle cover 51, and the upper gear 521 presses against the bearing 53. As the swivel caster is in a state of free rotation, there is a certain distance between the upper cylinder of upper gear 521 and the lower cylinder of lower gear 522 although they both are arranged inside the bearing 53, as a result the first and second meshing teeth cannot contact with each other.

Figure 1:
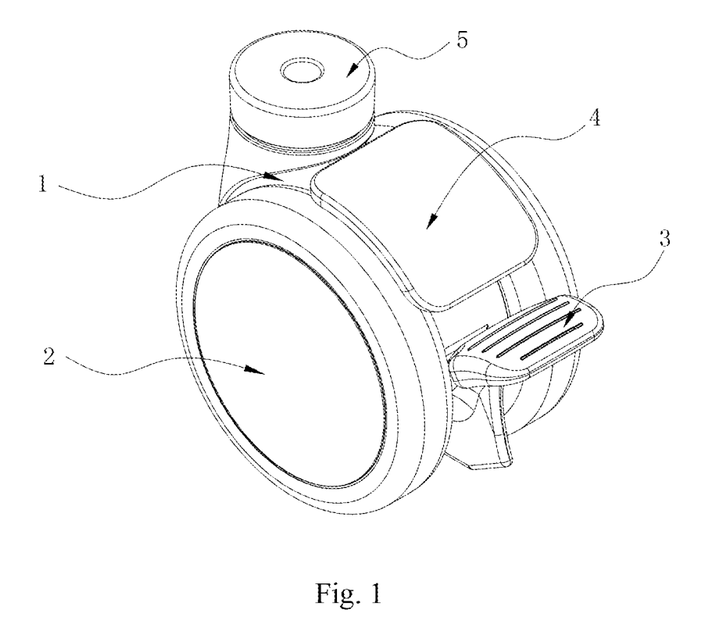
FIG. 1 is a perspective view of a double-pedal controlled caster according to an example of the present application.
Figure 2:
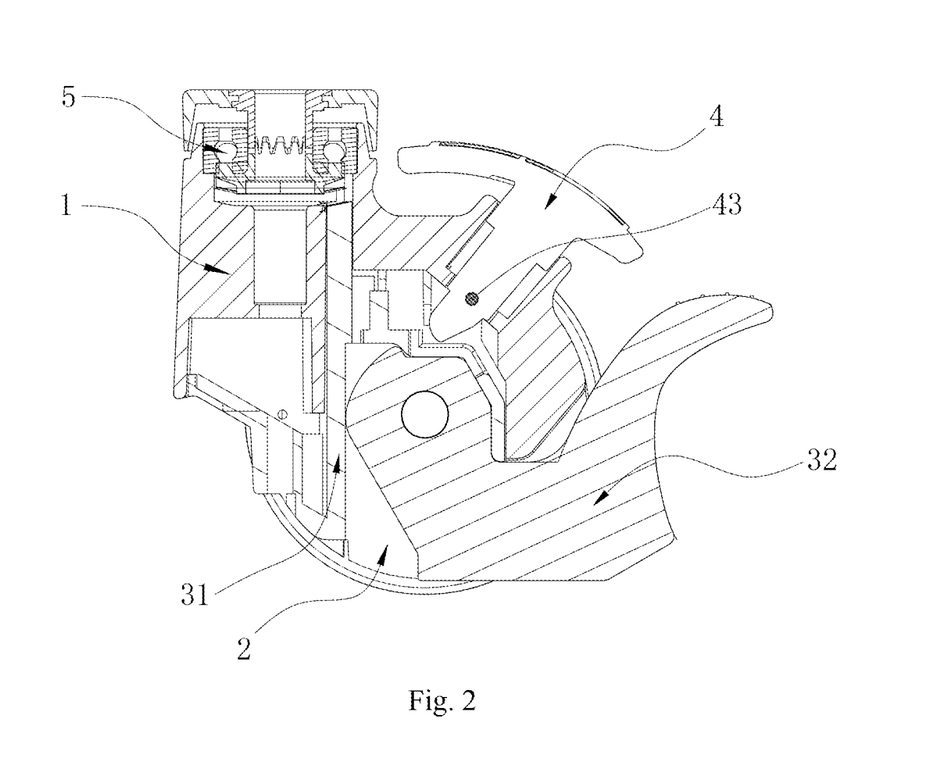
FIG. 2 is a sectional view of a double-pedal controlled caster according to an example of the present application.
Figure 3:
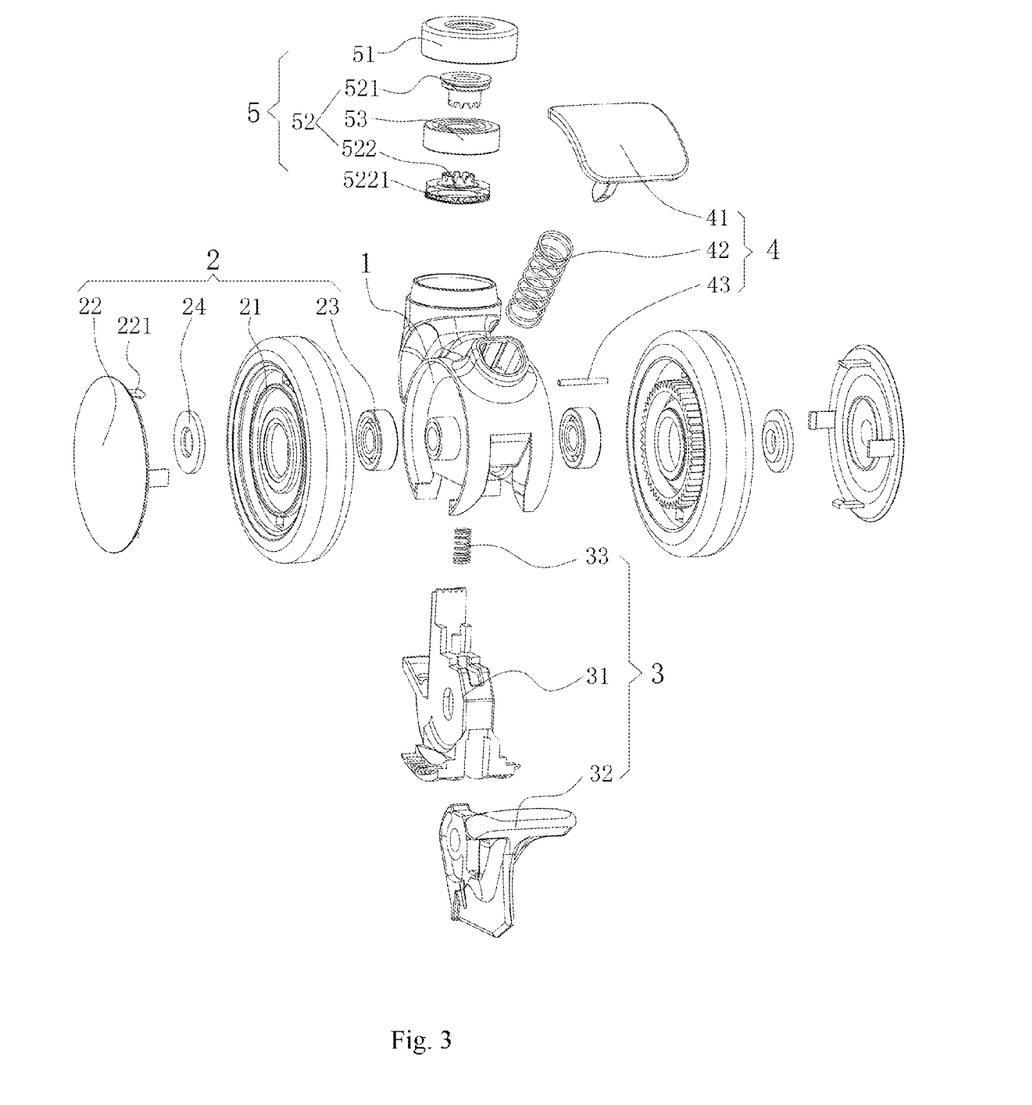
FIG. 3 is an exploded perspective view of a double-pedal controlled caster according to an example of the present application.
Figure 6:
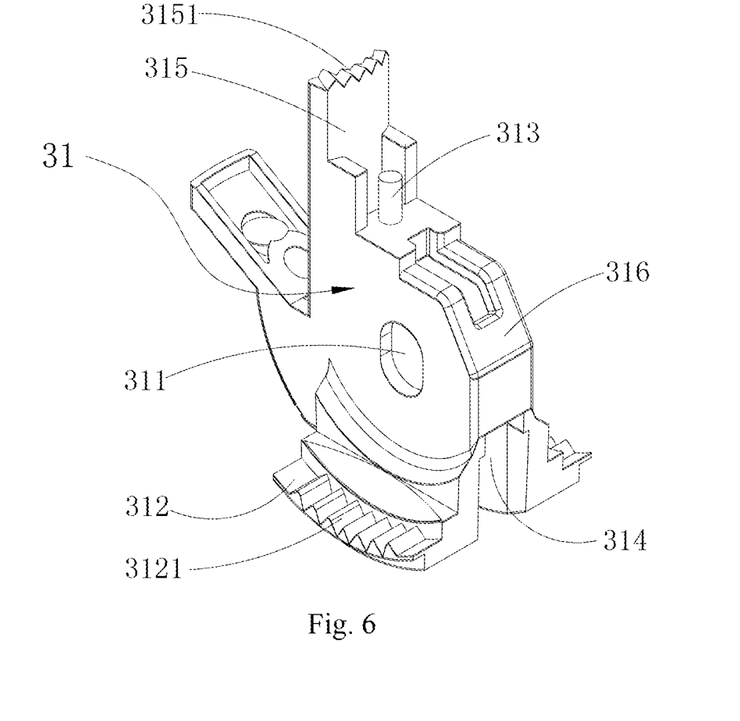
FIG. 6 is a perspective view of the brake block of a double-pedal controlled caster according to an example of the present application.

Next, please refer to FIGS. 3 and 6, a brake groove 13 is arranged inside the caster main frame 1, a brake module 3 is disposed inside the brake groove 13, the brake module 3 contains a brake block 31 arranged inside the brake groove 13 and a brake pedal 32 arranged inside the brake block 31 with one side thereof extending to the outside of the caster main frame 1 and jacking up the brake block 31. In particular, a hollow groove 131 is arranged inside the caster main frame 1, a through hole (not shown) connects the hollow groove 131 with the main shaft hole 15. A first universal engaging tooth 5221 is arranged on the bottom of the lower gear 522 of the swivel assembly 5, a top sheet 315 is arranged on the top of the brake block 31, and a second universal engaging tooth 3151 engagable with the first universal engaging tooth 5221 is disposed on the top sheet 315. The top sheet 315 of the brake block 31 can contact with the swivel assembly 5 inside the main shaft hole 15 through the through hole (not shown) connecting the hollow groove 131 with the main shaft hole 15. When the brake pedal 32 is pressed down, the brake pedal 32 jacks the brake block 31 up, therefore the top sheet 315 of the brake block moves upwards to contact with the lower gear 522 of the swivel assembly 5, meanwhile, the first universal engaging tooth 5221 is engaged with the second universal engaging tooth 3151, as a result the lower gear 522 cannot rotate. At the same time, as the brake block 31 moves upwards, the lower gear 522 is forced to move upwards, therefore the upper gear 521 of the universal brake gear set 52 contacts with the lower gear 522, as a result the first meshing tooth of the universal brake gear set 52 is engaged with the second meshing tooth, and the upper gear 521 cannot rotate, meanwhile the universal brake gear set 52 presses downwards against the bearing 53, so the inner and outer rings of the bearing 53 cannot rotate, so as to control the swivel caster and make it cannot rotate relative to the axis body of the connection device. That is to say, when the brake block 31 jacks up, the universal brake gear set is locked by the top sheet 315, therefore the whole swivel caster is controlled and cannot rotate relative to the connected device, so the rotation direction of the swivel caster is locked.

In particular, please refer to FIG. 5, an annular groove 212 is disposed on one side of the wheel sheet 21, and a first brake engaging tooth 2121 is arranged on the wall surface of the inner ring of the annular groove 212. The brake block 31 includes a main body 31, a positioning hole 311 arranged at the center of the main body 31 and movable upwards and downwards along the central shaft 11 of the central shaft 11 of the caster main frame 1 and a brake pad 312 extending outwards from each side of the bottom of the main body 31, wherein the brake pad 312 passes through the caster main frame 1 and inserts into the annular groove 212 of the wheel sheet 21, and a second brake engaging tooth 3121 engagable with the first brake engaging tooth 2121 is arranged on the surface of the brake pad 312. A side groove 132 is disposed on the bottom of the caster main frame 1 so as to connect the hollow groove 131 with the wheel sheet slot 12. And the brake pad 312 is just arranged inside the side groove 132 of the caster main frame 1. When the wheel sheet 21 of the swivel caster rotates normally, the brake pad 312 is only inserted into the annular groove 212 of the wheel sheet 21 through the side groove 132, at this time, the first brake engaging tooth 2121 does not contact with the second brake engaging tooth 3121, therefore the brake block 31 has no effect on the rotation of the wheel sheet 21. When the brake pedal 32 is pressed down, the brake pedal 32 props up the brake block 31 and forces the brake pad 312 of the brake block 31 to move upwards, then the first brake engaging tooth 2121 is engaged with the second brake engaging tooth 3121, and the brake pad 312 controls the wheel sheet 21 and prohibits its rotation, so as to perform a brake to the swivel caster, so the swivel caster cannot move and the wheel sheet 21 of the swivel caster is locked.

Accordingly, when the brake pedal 32 is pressed down, the brake pedal 32 props up the brake block 31, then the top sheet 315 at the top of the brake block 31 is connected with the swivel assembly 5, therefore the rotation direction of the swivel caster can be controlled; meanwhile the brake pads 312 on both sides of the brake block 31 are forced to move upwards and connect with the wheel sheets 21 on both sides of the caster main frame 1, so as to control the rotation of the wheel sheet of the swivel caster, and the lock of the rotation direction of the swivel caster and brake are performed.

Figure 7:
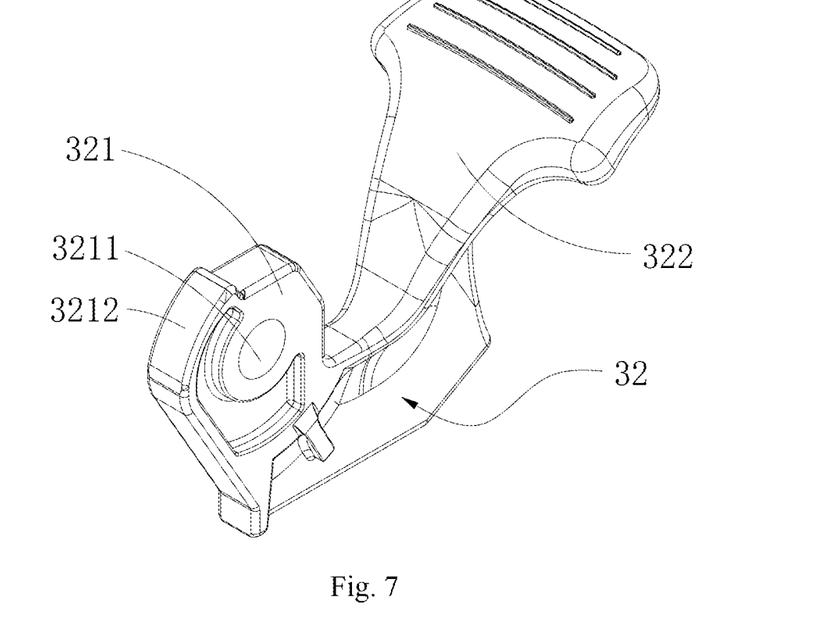
FIG. 7 is a perspective view of the brake pedal of a double-pedal controlled caster according to an example of the present application.

In particular, a hollow groove 314 is arranged inside the brake block main body 31, the brake pedal 32 contains a main body 321 and a pedal 322 connected with the main body 321 and extending outwards. A center hole 3211 concentrical to the central shaft 11 of the caster main frame 1 is arranged on the main body 321, a convex surface 3212 contactable with the brake block 31 is arranged on the outer side of the main body 321, and the main body 321 is arranged inside the hollow groove 314 of the brake block main body 31. According to the embodiments of the present application, when the brake pedal 32 is pressed down, the main body 321 of the brake pedal rotates around the center hole 3211, and the convex surface 3212 butts against the inner part of the brake block 31. When the pedal 322 of the brake pedal 322 is pressed down, the convex surface 3212 butts against the brake block 31 and moves upwards so as to carry out the process of braking of swivel caster and stopping the rotation of the caster. A positioning column 313 is disposed on the brake block main body 31, and a positioning hole (not shown) corresponding to the positioning column 313 is arranged inside the caster main frame 1, a retaining spring 33 is arranged on the positioning column 313. As the brake pedal 32 rotates along the convex surface 3212 when the brake pedal is pressed down to prop up the brake block 31, when the top sheet 315 of the brake block 31 butts against the lower gear 522 of the swivel assembly 5 and reaches the peak point of the brake block 31, the retaining spring 33 on the positioning column 313 reaches its ultimate state, so the brake block 31 cannot move upwards any more, and the brake pedal 32 cannot be pressed down any more. The retaining spring 33 plays a restriction role on the upward movement of the brake block 31.

Figure 8:
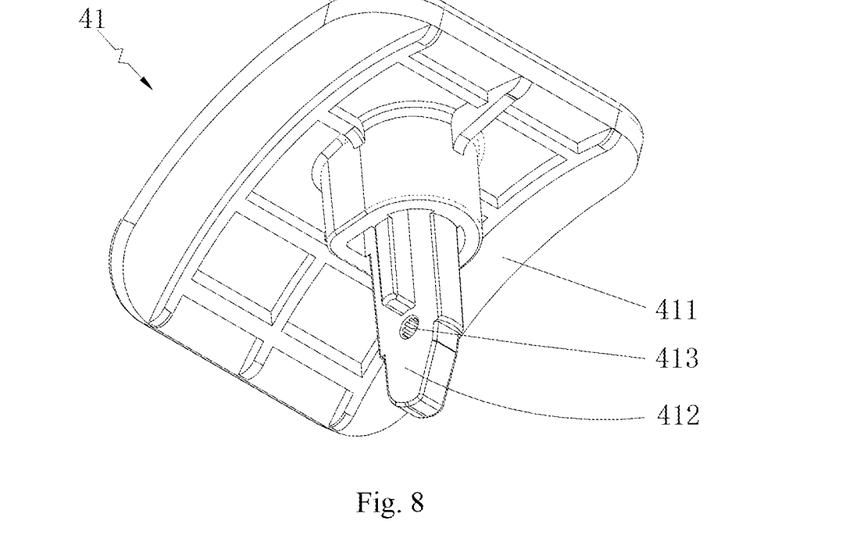
FIG. 8 is a perspective view of the brake release pedal of a double-pedal controlled caster according to an example of the present application.

A slope 316 is arranged on the main body of the brake block 31, and the ejector rod 412 of the brake release pedal 41 butts against the slope 316. When the brake release pedal 41 is pressed down, the ejector rod 412 of the brake release pedal 41 moves downwards long the restriction rail 141, therefore the ejector rod 412 butts against the slope 316 of the brake block 31, the brake block 31 receives a downward force, the brake block 31 moves downwards, and the top sheet 315 on the brake block 315 separates from the lower gear 522 of the swivel assembly 5 then the swivel caster obtains the ability of universal rotation again, and the second brake engaging tooth 3121 of the brake pad 312 of the brake block 31 separates from the first brake engaging tooth 2121 of the wheel sheet 21 so as to endow the wheel sheet with the ability of rotating again. So the swivel caster is released from the "double locked" state. When the brake block 31 moves downwards, it takes the brake pedal 32 to rotate around the center hole 3211, and the pedal 322 of the brake pedal 32 moves upwards and resets to initial state.

Specifically, the slope 316 locates in an acute angle of 20 to 40 degrees with the vertical horizon. If the slope 316 has an unreasonable arrangement, the brake block 31 cannot be pressed down when the brake release pedal 41 is pressed down, so the action of braking cannot be performed.

In particular, please refer to FIGS. 3 to 4-2 and FIG. 8, a brake release groove 14 and a restriction rail 141 disposed along the axis thereof are arranged on the caster main frame 1, and a brake release module 4 containing a brake release pedal 41 and a spacing shaft 43 is arranged inside the brake release groove 14, wherein the brake release pedal 41 contains a pedal 411 and an ejector rod 412 perpendicular to the pedal 411, a spacing hole 413 for spacing shaft 43 passing through is disposed on the ejector rod 412, the spacing shaft 43 is arranged through the spacing hole 413 of the ejector rod 412 and it is movable along the restriction rail 141 of the caster main frame, the ejector rod 412 butts against the brake module 3, and the brake release module 41 further contains a return spring 42 arranged on the ejector rod 412 of the return spring 42. The brake release groove 14 is arranged above the caster main frame 1. The pedal 411 is disposed outside the brake release groove 14 so it can be stepped and controlled, the ejector rod 412 connected with the pedal 411 is inserted into the brake release groove 14. A restriction rail 141 is disposed on the brake release groove 14 along the axis thereof, the restriction rail 141 is a long middle hole capable of running through the left and right wheel sheet slots 12 arranged on the left and right wheel sheet slots 12 of the caster main frame 1, and the long middle hole is arranged along the axis of the brake release groove 14. The spacing shaft 43 is set up through the long middle hole, and it is movable along the long middle hole. Both ends of the spacing hole 413 arranged on the ejector rod 412 can connect with the long middle hole of the caster main frame 1, as a result the spacing shaft 43 can move through both the restriction rail 141 and spacing hole 413 back and forth, that is, the spacing shaft 43 can move along the axis direction of the brake release groove 14 back and forth. Accordingly, the ejector rod 412 can only move along the axial direction of the brake release groove 14 under the interaction between the spacing shaft 413 and the restriction rail 141. When the brake pedal 41 is pressed down, the brake pedal 41 moves along the axial direction of the brake release groove 14. Further, the ejector rod 412 contains a return spring 42 arranged thereon, which butts against the connection portion between the pedal 411 and the ejector rod 412 by one end and against the bottom of the brake release groove 14 by the other end. When the brake release pedal 41 is pressed down, the pedal 411 receives a downward force at the same time, therefore the ejector rod 412 butts against the brake module 3 and forces the brake module 3 to move downwards, so as to release the brake action of the brake module 3. After releasing the pedal 411, the pedal 411 moves upwards to reset automatically under the function of the return spring 42, and the ejector rod 412 separates from the brake module 3. The movement of the brake release pedal 41 is just the reciprocating motion along the axial direction of the brake release groove 14, and it only controls the brake module 3 and does not make any effect on other components of the caster.

In summary, the double-pedal controlled swivel caster according to the present application contains a swivel assembly, and the caster can rotate universally, it also contains a brake module 3 capable of locking the wheel sheet 21 of the caster by means of the brake pedal 3 so as to prohibit its rotation, the brake module 3 can also forbid the rotation of the whole caster by locking it. Meanwhile, there is a brake release module 4 capable of releasing the caster from the double locked status by means of the brake release pedal 41 having the same orientation with the brake module 3, in particular, as the brake release pedal is pressed, the brake block 31 of the brake module 3 is pushed down so the caster obtains the movement of freedom, and the brake release module 4 eliminates the painful lift of the brake pedal for the brake release, therefore both the actions of brake and release are easy to perform.

The embodiments above are merely the preferable embodiments of the present application and not intended to limit the present application. And all changes equivalent substitution and improvements which come within the meaning and range of equivalency of the present application are intended to be embraced therein.

I claim:

1. A double-pedal-controlled swivel caster comprising a caster main frame, a pair of caster assemblies disposed at both sides of the caster main frame, a swivel assembly disposed on the caster main frame, and a braking module arranged in the caster main frame for braking as a brake pedal is pressed down, and a brake release module arranged in the caster main frame for resetting the movement of the caster as a brake release pedal is pressed down;

wherein a main shaft hole is arranged on the caster main frame, and the swivel assembly comprises a spindle cover, a bearing and a universal brake gear set comprising a upper gear and a lower gear engaging therewith, the universal brake gear set is arranged inside the bearing, the universal brake gear set and the bearing are fixed inside the main shaft hole by means of the spindle cover;

a brake groove is arranged inside the caster main frame, the brake module is disposed inside the brake groove, the brake module comprises a brake block arranged inside the brake groove for controlling the rotation of the wheel sheet and a brake pedal arranged inside the brake block with one side thereof extending outside of the caster main frame for jacking up the brake block;

first universal engaging teeth are arranged at the bottom of the lower gear of the swivel assembly, a top sheet is arranged on the top of the brake block, second universal engaging teeth engagable with the first universal engaging teeth are disposed on the top sheet; and a brake release groove and a restriction rail along the axis thereof are arranged on the caster main frame, and the brake release module comprising a brake release pedal and a spacing shaft is arranged inside the brake release groove, wherein the brake release pedal contains a pedal and an ejector rod perpendicular thereto, a spacing hole is disposed on the elector rod for the spacing shaft passing through, the spacing shaft is movable along the restriction rail of the caster main frame, and the ejector rod butts against the brake module.

2. The double-pedal controlled swivel caster of claim 1, wherein there are two wheel sheet slots for receiving the caster assemblies arranged on both sides of the caster main frame and a central shaft disposed in each of the wheel sheet slots, and each caster assembly comprises a wheel sheet sleeved on the central shaft.

3. The double-pedal controlled swivel caster of claim 2, wherein a main shaft hole is arranged on the caster main frame, and the swivel assembly comprises a spindle cover, a bearing and a universal brake gear set comprising a upper gear and a lower gear engaging therewith, the universal brake gear set is arranged inside the bearing, the universal brake gear set and the bearing are fixed inside the main shaft hole by means of the spindle cover.

4. The double-pedal controlled swivel caster of claim 3, wherein a brake groove is arranged inside the caster main frame, the brake module is disposed inside the brake groove, the brake module comprises a brake block arranged inside the brake groove for controlling the rotation of the wheel sheet and a brake pedal arranged inside the brake block with one side thereof extending outside of the caster main frame for jacking up the brake block.

5. The double-pedal controlled swivel caster of claim 4, wherein first universal engaging teeth are arranged at the bottom of the lower gear of the swivel assembly, a top sheet is arranged on the top of the brake block, second universal engaging teeth engagable with the first universal engaging teeth are disposed on the top sheet.

6. The double-pedal controlled swivel caster of claim 3, wherein an annular groove is disposed on one side of the wheel sheet, and first brake engaging teeth are arranged on the wall surface of an inner ring of the annular groove, the brake block includes a main body, a positioning hole arranged at the center of the main body and movable upwards and downwards along a central shaft of the caster main frame, and two brake pads extending outwards from both sides of the bottom of the main body, wherein the brake pad passes through the caster main frame and inserts into the annular groove of the wheel sheet, and second brake engaging teeth engagable with the first brake engaging teeth are arranged on the surface of the brake pad.

7. The double-pedal controlled swivel caster of claim 6, wherein a hollow groove is arranged inside the brake block main body, the brake pedal comprises a main body and a pedal connected to the main body and extending outwards, a center hole concentrical to the central shaft of the caster main frame is arranged on the main body, a convex surface contactable with the brake block is arranged outside the main body, and the main body is arranged inside the hollow groove of the brake block main body.

8. The double-pedal controlled swivel caster of claim 7, wherein a slope is arranged on the main body of the brake block, and the brake release module butts against the slope.

9. The double-pedal controlled swivel caster of claim 1, wherein an annular groove is disposed on one side of the wheel sheet, and a-first brake engaging teeth are arranged on the wall surface of an inner ring of the annular groove, the brake block includes a main body, a positioning hole arranged at the center of the main body and movable upwards and downwards along a central shaft of the caster main frame, and two brake pads extending outwards from both sides of the bottom of the main body, wherein the brake pad passes through the caster main frame and inserts into the annular groove of the wheel sheet, and second brake engaging teeth engagable with the first brake engaging teeth are arranged on the surface of the brake pad.

10. The double-pedal controlled swivel caster of claim 9, wherein a hollow groove is arranged inside the brake block main body, the brake pedal comprises a main body and a pedal connected to the main body and extending outwards, a center hole concentrical to the central shaft of the caster main frame is arranged on the main body, a convex surface contactable with the brake block is arranged outside the main body, and the main body is arranged inside the hollow groove of the brake block main body.

11. The double-pedal controlled swivel caster of claim 10, wherein a slope is arranged on the main body of the brake block, and the brake release module butts against the slope.

12. The double-pedal controlled swivel caster of claim 1, wherein the brake release module further comprises a return spring arranged on the ejector rod.

* * * * *